US012736858B1

(12) United States Patent
Bone et al.

(10) Patent No.: US 12,736,858 B1
(45) Date of Patent: Sep. 15, 2026

(54) ERGONOMIC CAMERA HANDLE

(71) Applicant: United States of America as represented by the Administrator of NASA, Washington, DC (US)

(72) Inventors: Jarret Carl Bone, Madison, AL (US); Jeremy Dwight Myers, Taft, TN (US); Jonathan Eugene Pryor, Madison, AL (US); Angus Ian Skye Ray, Houston, TX (US)

(73) Assignee: United States of America as represented by the Administrator of NASA, Washington, DC (US)

(*) Notice: Subject to any disclaimer, the term of this patent is extended or adjusted under 35 U.S.C. 154(b) by 172 days.

(21) Appl. No.: 18/649,550

(22) Filed: Apr. 29, 2024

(51) Int. Cl.
*G03B 17/56* (2021.01)

(52) U.S. Cl.
CPC ......... *G03B 17/563* (2013.01); *G03B 17/565* (2013.01); *G03B 17/566* (2013.01)

(58) Field of Classification Search
CPC ... G03B 17/563; G03B 17/566; G03B 17/565
See application file for complete search history.

(56) References Cited

U.S. PATENT DOCUMENTS 4,752,792 A * 6/1988 Keith .................. G03B 17/563 396/425
5,239,323 A 8/1993 Johnson
6,014,522 A 1/2000 Reber, II
7,801,425 B2 9/2010 Fantone
8,903,229 B2 12/2014 Ghali et al.
2004/0076415 A1 4/2004 Da Silva
2007/0071423 A1* 3/2007 Fantone ................ G03B 17/08 396/27
2020/0393743 A1* 12/2020 Shibata .................. G03B 17/02
2024/0184186 A1* 6/2024 Thomson .............. G01C 21/18

FOREIGN PATENT DOCUMENTS

CA 2496504 A1 4/2006
CN 1815345 A * 8/2006 ............ G03B 17/12
GB 2255648 A 11/1992
WO 80/00881 A1 5/1980
WO 2014/203017 A1 12/2014

* cited by examiner

*Primary Examiner* — Minh Q Phan
(74) *Attorney, Agent, or Firm* — Jerry L. Seemann; Trenton J. Roche

(57) ABSTRACT

An ergonomic camera handle having a generally "L" shaped body having a base portion and an upright portion. The base portion has a slot for removably inserting therein a camera base plate. The base plate may be inserted into and removed from the slot without tools. The handle includes tactile buttons for controlling camera functions and an angulated rear window for viewing the rear display screen of the camera. The handle includes a reset button for resetting the camera in the event of interruption of battery power to the camera. A protective enclosure encloses the handle and camera and has a front opening aligned with the camera lens and a rear opening for viewing the camera's rear display screen. The protective enclosure has indicia thereon that are aligned with the tactile buttons on the handle to allow a user to depress the buttons on the handle with a gloved hand.

19 Claims, 14 Drawing Sheets

ERGONOMIC CAMERA HANDLE

CROSS-REFERENCES TO RELATED PATENT APPLICATIONS

None.

FIELD OF THE INVENTION

The present invention relates to an ergonomic camera holder.

BACKGROUND

The lunar surface environment requires astronauts to use large pressurized gloves that significantly reduce mobility. Operating cameras in lunar environments with large pressurized gloves is very difficult. Typically, the camera is positioned within a protective enclosure or blanket. The camera must be operated so as to obtain photos and videos, provide a review of the obtained photos and videos and then switch between picture and video mode while the user is wearing the large, pressurized gloves. However, the integrated camera buttons associated with the photo and video functions are too small making it very difficult to manipulate through the gloves. Even if there was a possibility of pushing the camera buttons, there is no tactile feedback through the protective blanket. In addition to the aforementioned difficulties and problems, conventional protective blankets or enclosures do not have high-integrity interfaces with the camera lens and rear display screen thereby exposing the camera to atmospheric and environmental hazards, such as extreme thermal temperatures in a vacuum and intrusive and abrasive lunar dust. Such atmospheric and environmental hazards may damage the camera and/or thwart operation of the camera.

What is needed is a novel apparatus that allows a user to easily operate a camera when the user is wearing protective or pressurized gloves.

SUMMARY

A summary of certain embodiments disclosed herein is set forth below. It should be understood that these aspects are presented merely to provide the reader with a brief summary of these certain embodiments and are not intended to limit the scope of this disclosure or the claimed subject matter. Indeed, this disclosure may encompass a variety of aspects that may not be set forth below.

In accordance with an aspect of the present disclosure, an ergonomic camera handle comprises a generally "L" shaped body having a base portion and a generally upright portion. The base portion is configured for removably attaching thereto a camera. The ergonomic camera handle further comprises a panel structure that is attached to the generally upright portion and configured with an opening. A window is positioned within the opening in the panel structure. The panel structure is configured so that a rear display screen of a camera may be positioned adjacent to the window when the camera is attached to the base portion thereby allowing a user to view the rear display screen of the camera. The window protects the camera display screen from dirt, dust, foreign particles and physical contact with other objects. The ergonomic camera handle further comprises at least one push-button mounted to the panel structure. The push-button is located at a predetermined location on the panel structure such that the push-button is aligned with a corresponding camera function button when a camera is attached to the base portion. The push-button engages the corresponding camera function button when the push-button is depressed.

In accordance with another aspect of the present disclosure, an ergonomic camera handle comprises a generally "L" shaped body having a base portion and a generally upright portion. The base portion is configured with a slot for removably inserting therein a base plate attached to a camera. The ergonomic camera handle further comprises a lock mechanism movably attached to the base portion and having a first normal state in which the lock mechanism retains the base plate within the slot and a second state in which the lock mechanism allows the base plate to be removed from the slot. A panel structure is attached to the generally upright portion and configured with an opening. A window is positioned within the opening in the panel structure. The panel structure is configured so that a rear display screen of a camera may be positioned adjacent to the window when the camera is mounted to the base portion so as to allow a user to view the rear display screen through the window. The panel structure is configured to orient the window and rear display screen at a predetermined angle that is optimal for viewing. The panel structure is also configured with a notch that is configured to receive a camera viewfinder. The ergonomic camera handle further comprises at least one push-button mounted to the panel structure. The push-button is located at a predetermined location on the panel structure such that the push-button is aligned with a corresponding camera function button when a camera is mounted to the base portion. The push-button engages the camera function button when the push-button is depressed. The ergonomic camera handle further comprises a camera shutter control button assembly mounted to the generally upright section and electrically connected to an auxiliary electrical signal port on the camera.

Another aspect of the present disclosure is directed to an ergonomic camera system for extreme environments comprising a camera, an ergonomic camera handle to which the camera is removably attached, and a protective enclosure that encloses the camera and ergonomic camera handle. The camera has a bottom portion, a base plate attached to the bottom portion, a rear display screen, a viewfinder, a shutter, at least one camera function button, a camera lens, an auxiliary electronic signal port and a battery. The ergonomic camera handle comprises a generally "L" shaped body having a base portion and a generally upright portion. The base portion has a slot that is configured for removably inserting therein the base plate of the camera. A lock mechanism is movably attached to the base portion and has a first normal state in which the lock mechanism retains the base plate within the slot and a second state in which the lock mechanism allows the base plate to be removed from the slot. A panel structure is attached to the generally upright portion and configured with an opening. A window is positioned within the opening in the panel structure. The panel structure is configured so that the rear display screen of the camera may be positioned adjacent to the window. The panel structure is configured to orient the window and the rear display screen at a predetermined angle. A frame member is removably attached to the panel structure and extends about the window. The panel structure is further configured with a notch that is sized and shaped to receive the camera viewfinder. The ergonomic camera handle further comprises at least one push-button mounted to the panel structure and located at a predetermined location such that the push-button is aligned with the at least one camera function button. The push-button engages the camera function button when the push-button is depressed. The ergonomic camera handle further comprises a camera shutter control button assembly mounted to the generally upright portion and electrically connected to the auxiliary electrical signal port on the camera. The protective enclosure is configured to enclose the ergonomic camera handle and the camera. The protective enclosure comprises a front portion, a rear portion, top portion and bottom portion. The front portion is configured with a front opening that is aligned with the camera lens and the rear portion is configured with a rear opening sized for viewing the window in the panel structure of the ergonomic camera handle. Portions of the protective enclosure that extend about the rear opening are secured between the panel structure and the frame member. The rear portion of the protective enclosure is configured with indicia that indicates the location of push-buttons on the ergonomic camera handle. A lens protector extends through the front opening and is mounted to the camera lens and comprises a clear filter that protects the camera lens. The lens protector is configured with a circumferentially extending groove. A portion of the protective enclosure is secured within the circumferentially extending groove.

BRIEF DESCRIPTION OF THE DRAWINGS

Aspects and implementations of the present disclosure will be understood more fully from the detailed description given below and the accompanying drawings of various aspects and implementations of the disclosure which, however, should not be taken to limit the disclosure to the specific aspects or implementations, but are for explanation and understanding only.

DETAILED DESCRIPTION

Reference in the specification to "an exemplary embodiment", "one embodiment" or "an embodiment" means that a particular feature, structure or characteristic described in connection with the embodiment is included in at least one embodiment of the invention. The appearances of the phrases "an exemplary embodiment", "one embodiment" or "an embodiment" in various places in the specification are not necessarily all referring to the same embodiment.

As used herein, the terms "comprise", "comprises", "comprising", "include", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

As used in this document, the singular form "a", "an" and "the" include plural references unless the context clearly dictates otherwise. Unless defined otherwise, all technical and scientific terms used herein have the same meanings as commonly understood by one of ordinary skill in the art.

As used herein, terms such as "vertical", "horizontal", "top", "bottom", "upper", "lower", "middle", "above", "below" and the like are used for convenience in identifying relative locations of various components and surfaces relative to one another in reference to the drawings and are not intended to be limiting in any way.

Figure 4:
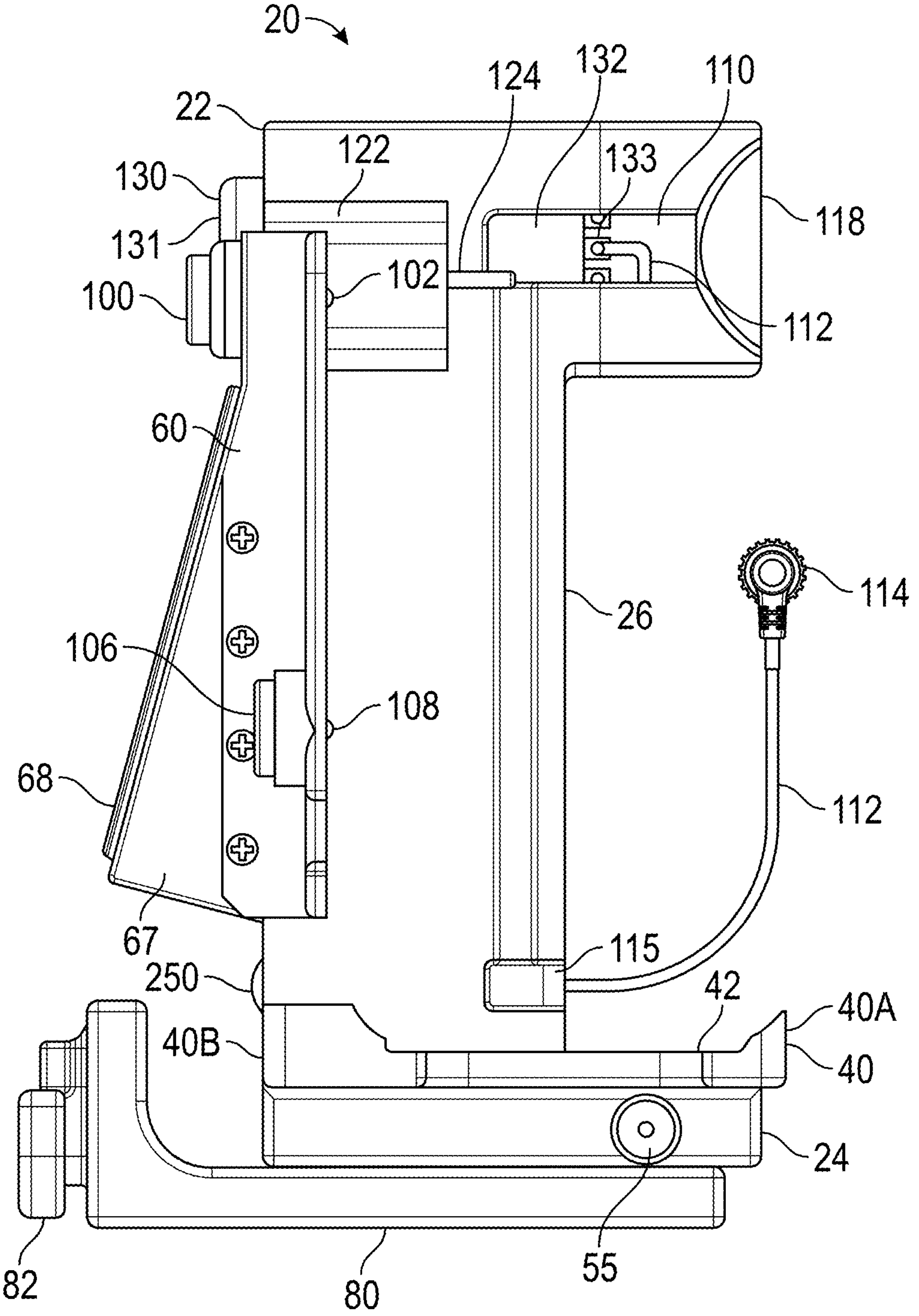
FIG. 4 is a left-side view of the ergonomic camera handle.
Figure 5A:
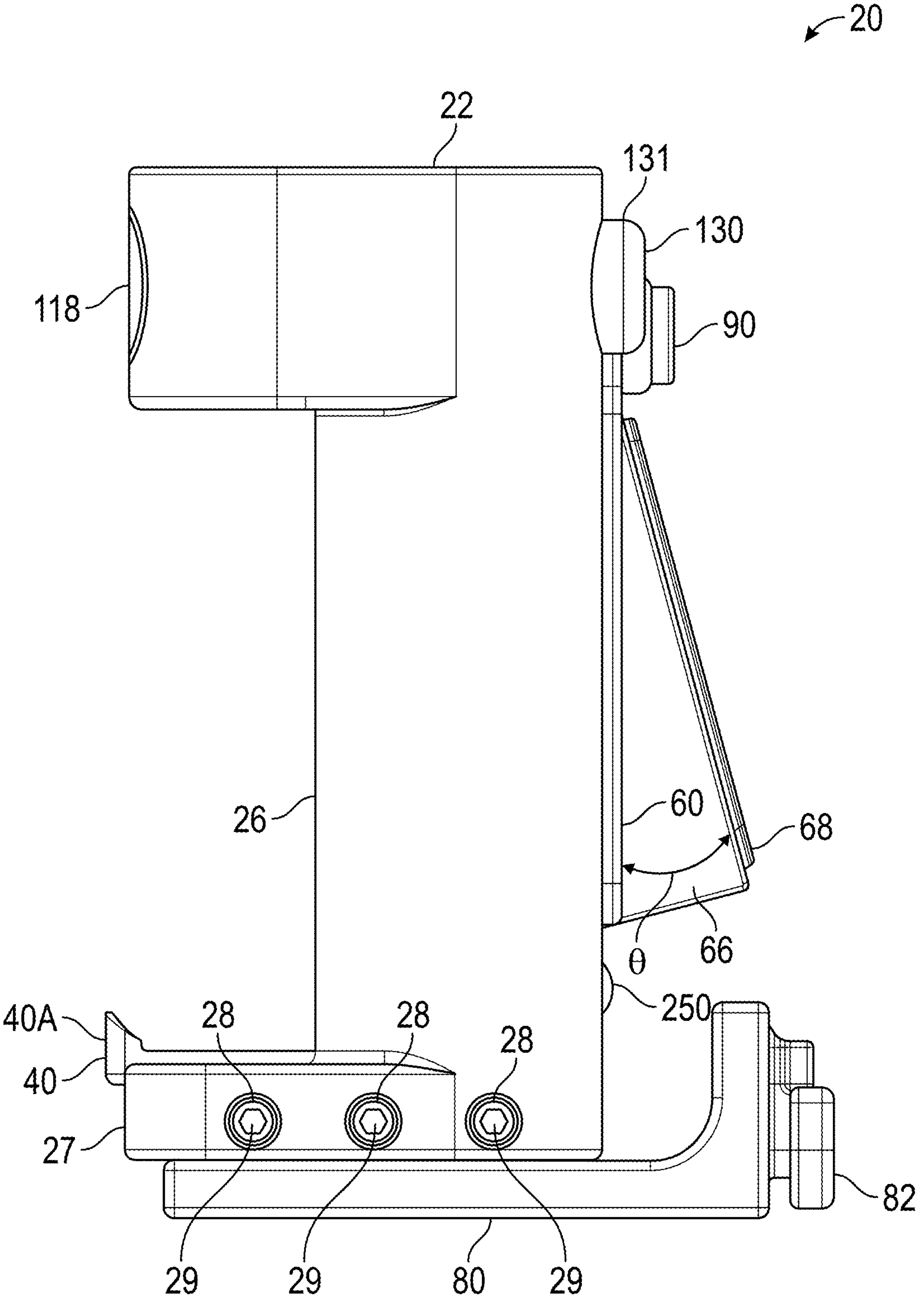
FIG. 5A is a right-side view of the ergonomic camera handle.
Figure 5B:
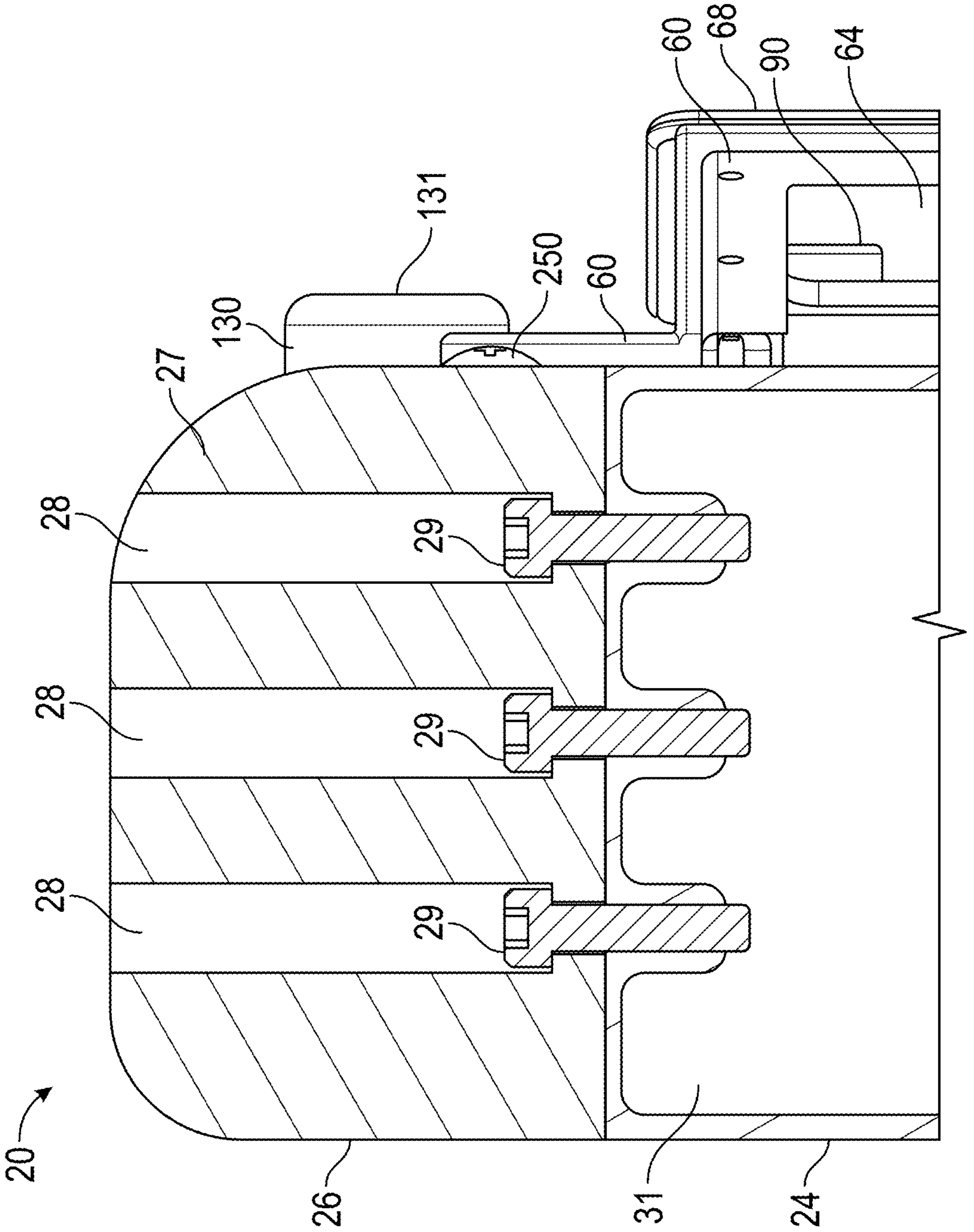
FIG. 5B is a partial, sectional view of the bottom of the ergonomic camera handle.

Referring to FIGS. 1-4, 5A and 5B, there is shown ergonomic camera handle 20 in accordance with an embodiment of the present disclosure. Handle 20 comprises a generally "L" shaped body 22 having base portion 24 and generally upright portion 26. Generally upright portion 26 has bottom portion 27. Base portion 24 and generally upright portion 26 are separate components that are attached or joined together. As shown in FIG. 5B, bottom portion 27 of generally upright portion 26 is configured with a plurality of channels 28. Each channel 28 is sized to receive a corresponding screw 29. Each screw 29 is threadedly engaged with a corresponding threaded inlet in base portion 24. Other methods and techniques for fabricating handle 20 are discussed in the ensuing description. Base portion 24 is configured so that camera 200 (see FIGS. 8 and 9) may be removably attached or mounted to base portion 24. Base portion 24 has top side 30 and bottom side 31. Top portion 30 is configured with slot 32 that is substantially perpendicular to reference axis 34 (see FIG. 1). In some embodiments, slot 32 is substantially "T" shaped and is oriented upside-down. Slot 32 is configured to receive a portion of camera base plate 40 that is attached to the bottom of camera 200. In order to facilitate understanding of this feature of handle 20, the drawings may show base plate 40 attached to base portion 24 without camera 200. However, it is to be understood that camera base plate 40 is typically attached to the bottom of camera 200 prior to being attached to base portion 24. Base portion 24 is configured with recesses 35 and 36 (see FIG. 7). The purposes of recesses 35 and 36 are discussed in the ensuing description. Handle 20 further includes retainer member 37 which is removably attached to base portion 24 and adjacent to slot 32. In some embodiments, retainer member 37 is removably attached to base portion 24 via screws 38. Screws 38 are threadedly engaged with corresponding threaded openings 39 in base portion 24 (see FIG. 7). The purpose of retainer member 37 is discussed in the ensuing description.

Figure 6A:
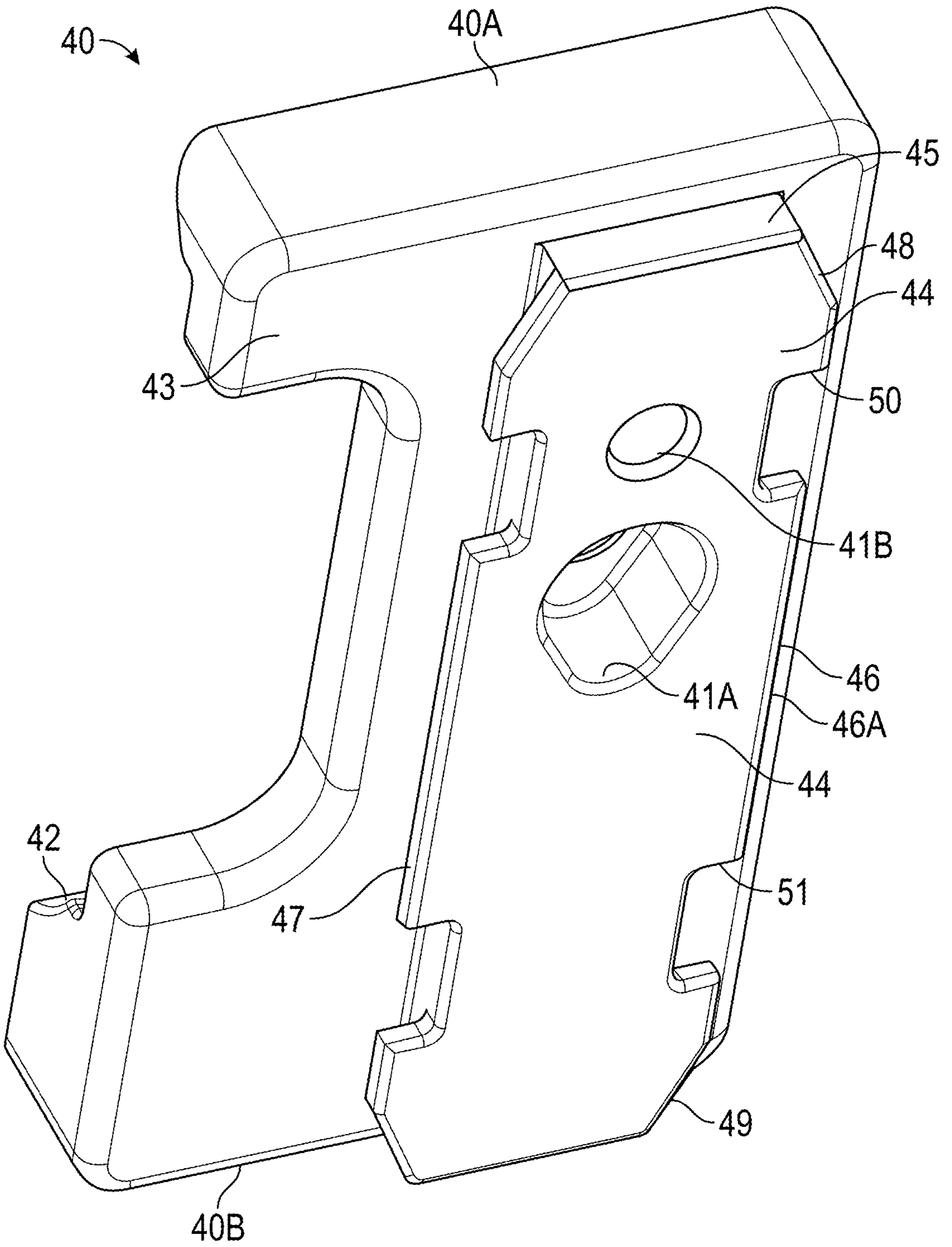
FIG. 6A is a bottom perspective view of a camera base plate that is configured to be removably attached to the ergonomic camera handle.
Figure 6B:
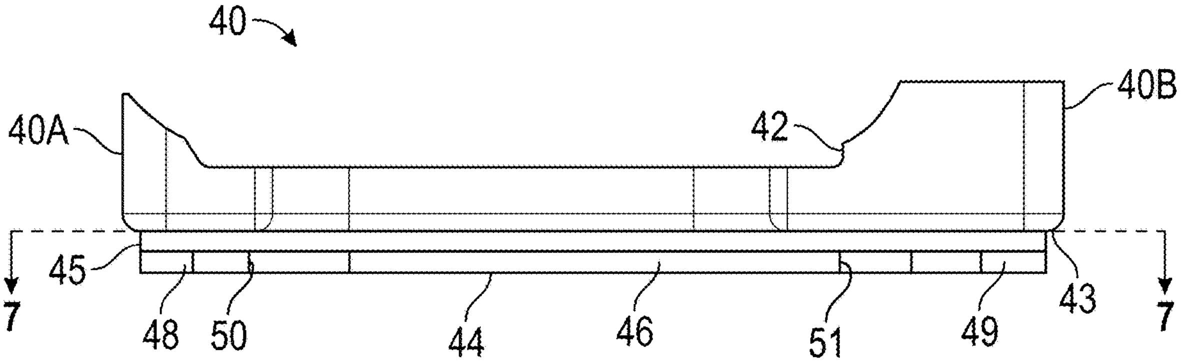
FIG. 6B is a side view of the camera base plate.
Figure 7:
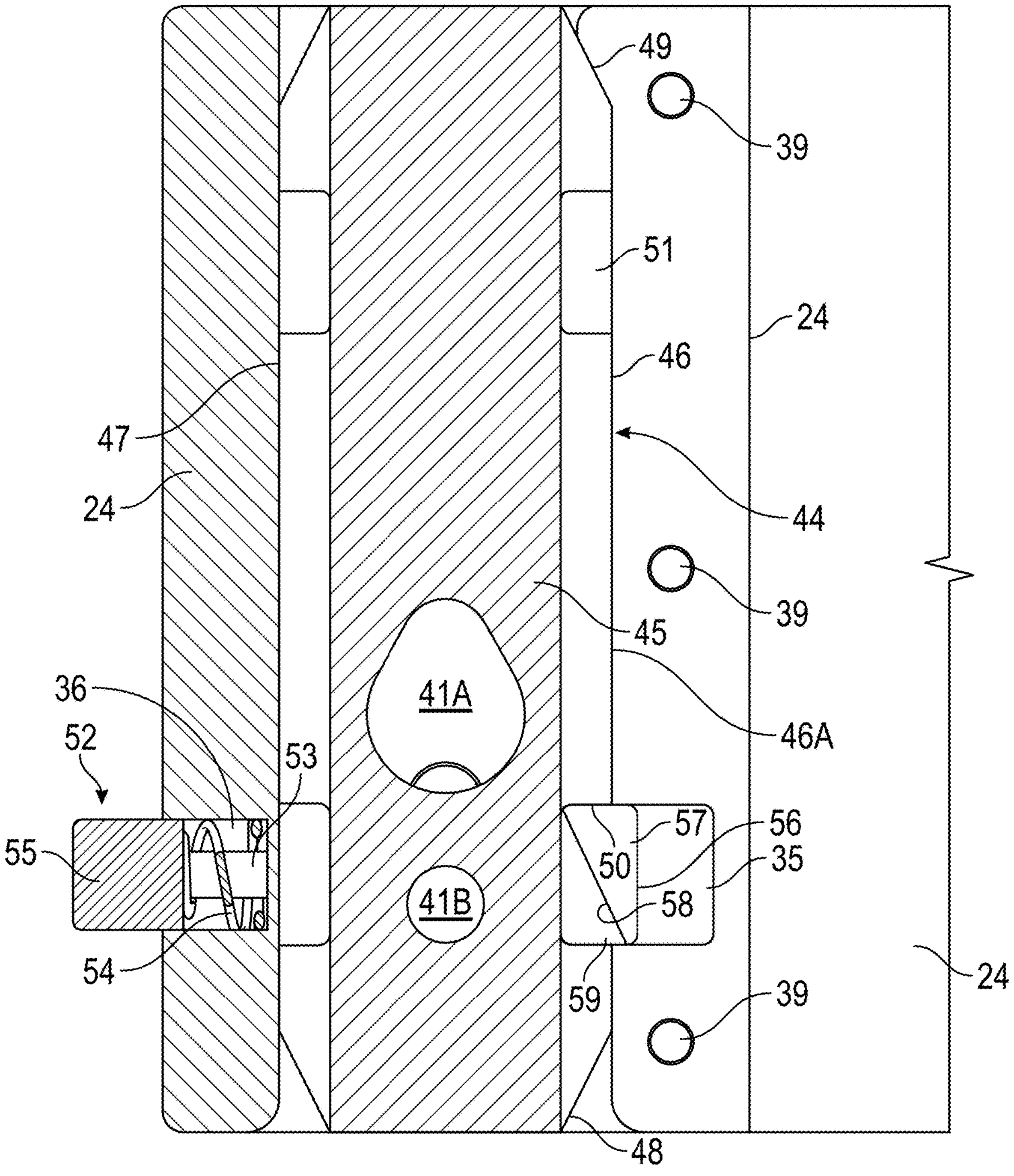
FIG. 7 is a sectional view taken along line 7-7 in FIG. 6B, the view illustrating how the camera base plate is mounted to the base portion of the ergonomic camera handle.

As shown in FIGS. 6A and 6B, base plate 40 has front end 40A and rear end 40B. Base plate 40 includes opening 41A that is sized for receiving a fastener (e.g., screw) that is used to attach base plate 40 to the bottom of camera 200. Once base plate 40 is securely attached to camera 200, the camera 200 may then by mounted to handle 20. Base plate 40 further includes opening 41B. Opening 41B is a threaded thru-hole configured to industry standards (e.g., %-20 threaded thru-hole) and allows camera 200 to be mounted to other equipment such as tripods or any other piece of equipment configured to have a camera mounted thereto. Opening 41B is not used when base plate 40 is securely attached to camera 200 and camera 200 is mounted to base portion 24 of handle 20. Base plate 40 includes top side 42 upon which camera 200 is seated (see also FIGS. 8 and 9). Base plate 40 includes bottom side 43 and rail structure 44 that protrudes from bottom side 43. Rail structure 44 is also known as a "T" rail and is configured to fit within the "T"-shaped slot 32 in base portion 24. FIG. 7 illustrates how rail structure 44 is positioned within slot 32. Rail structure 44 has central section 45 and flanged portions 46 and 47 that extend from central section 45. Flanged portions 46 and 47 are identical structure and therefore only flanged portion 46 is described in detail. Flanged portion 46 has angulated or beveled portions 48 and 49, and slots or notches 50 and 51. Handle 20 further comprises release mechanism 52 that is movably attached to base portion 24. Release mechanism 52 has a first normal state in which base plate 40 is retained in slot 32. Release mechanism 52 may be configured to a second state to release base plate 40 from slot 32. Release mechanism 52 comprises shaft 53 and spring 54 which is mounted on shaft 53. Shaft 53 extends through an internal channel (not shown) in base portion 24. Release mechanism 52 further includes knob 55 which is attached to one end of shaft 53. Knob 55 is sized to move within recess 36 in base portion 24. Release mechanism 52 further includes interfering member 56 that is attached to the opposite end of shaft 53 and is located within recess 35 in base portion 24. Interfering member 56 has raised portion 57 which has beveled surface 58. Interfering member 56 further includes lower portion 59 which has a smooth surface. Lower portion 59 is substantially perpendicular to beveled surface 58. As a user is inserting base plate 40 into slot 32, beveled surface 49 of flanged portion 46 slides along beveled surface 58 of interfering member 56 thereby pushing interfering member 56 into recess 35 which results in the compression of spring 54. The user then depresses knob 55 to maintain spring 54 in a compressed state and interfering member 56 positioned within recess 35 as the user continues to push base plate 40 into slot 32. Maintaining interfering member 56 in recess 35 prevents interfering member 56 from slipping into notch 51 while inserting base plate 40 into slot 32. Once notch 51 passes interfering member 56, the user may remove his or her finger from knob 55 because as the user continues to push base plate 40 into slot 32, the interfering member 56 stays in contact with portion 46A of flanged portion 46 thereby keeping spring 54 compressed. The user continues to push base plate 40 into slot 32 until interfering member 56 slips into notch 50 in flange portion 46. Retainer member 37 is positioned over interfering member 56 (see FIG. 1) and prevents interfering member 56 from pivoting if shaft 53 should pivot or rotate for any reason. In order to remove base plate 40 from slot 32, the user depresses knob 55 into recess 36 in order to move interfering member 56 out of notch 50. The user then continues to depress knob 55 as base plate 40 is pulled out of slot 32 to ensure that interfering member 56 does not slip into notch 51. As shown by the foregoing description, no tools are required to insert base plate 40 into slot 32 or remove base plate 40 from slot 32.

Figure 1:
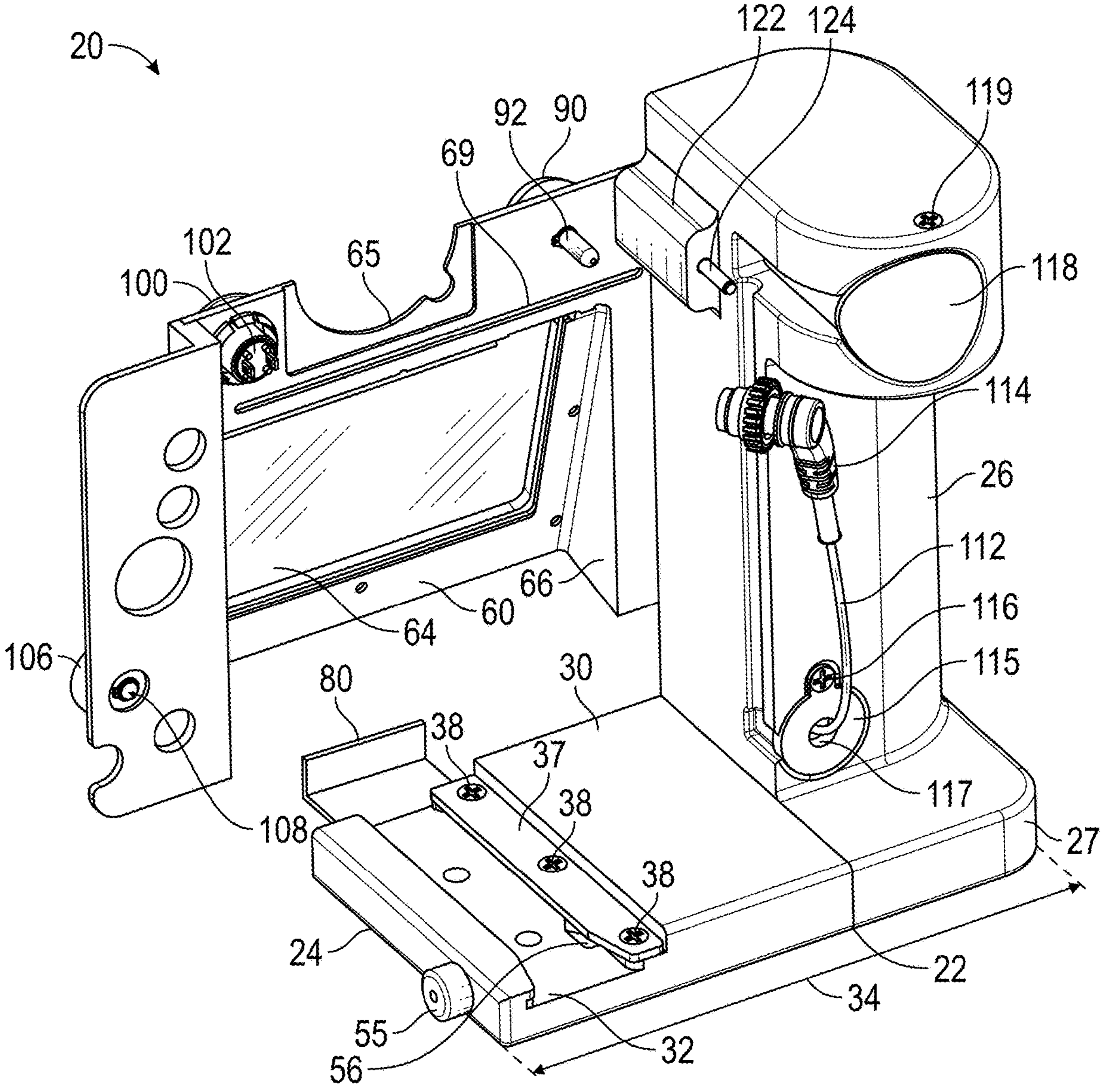
FIG. 1 is a front perspective view of the ergonomic camera handle in accordance with the present disclosure.
Figure 2:
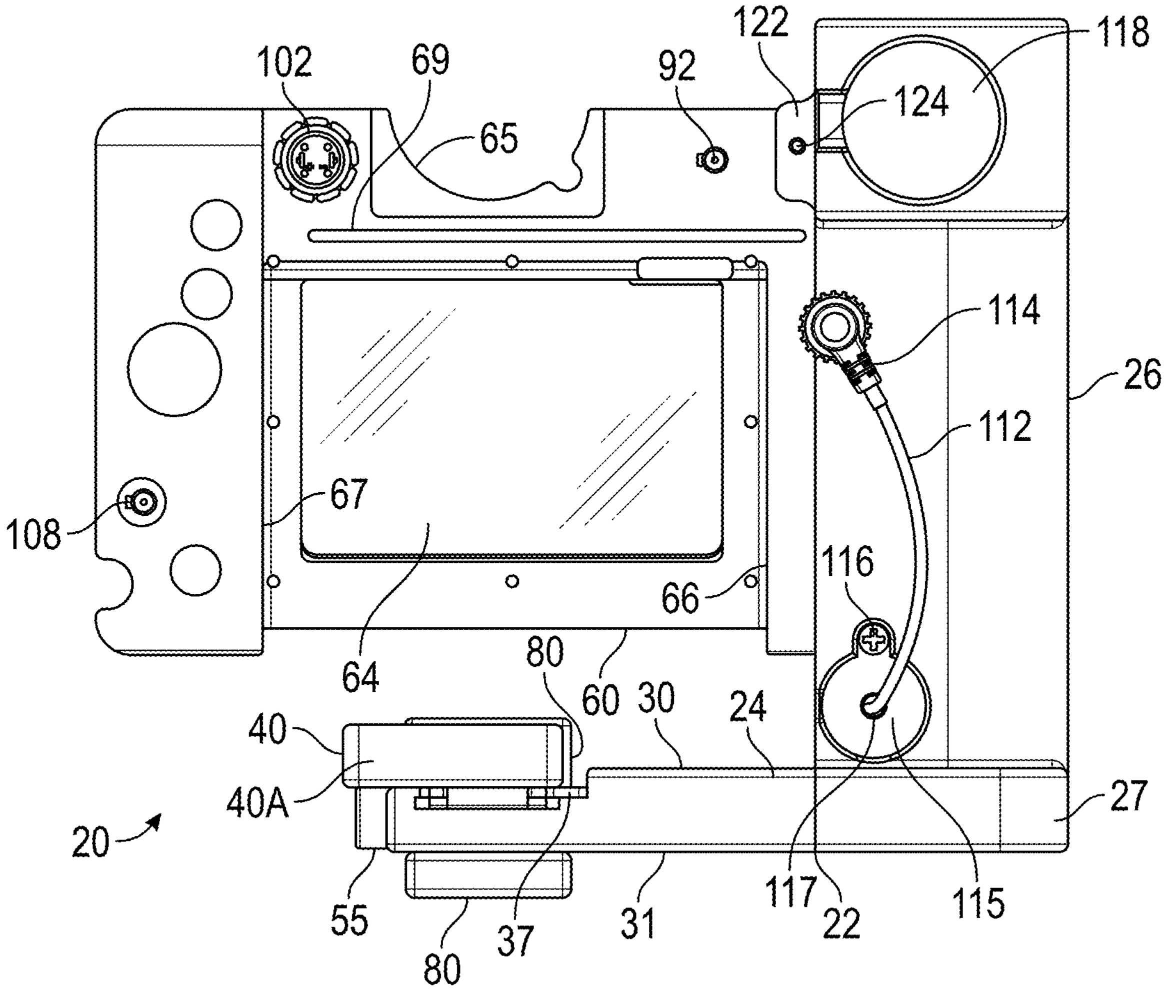
FIG. 2 is a front view of the ergonomic camera handle.
Figure 3:
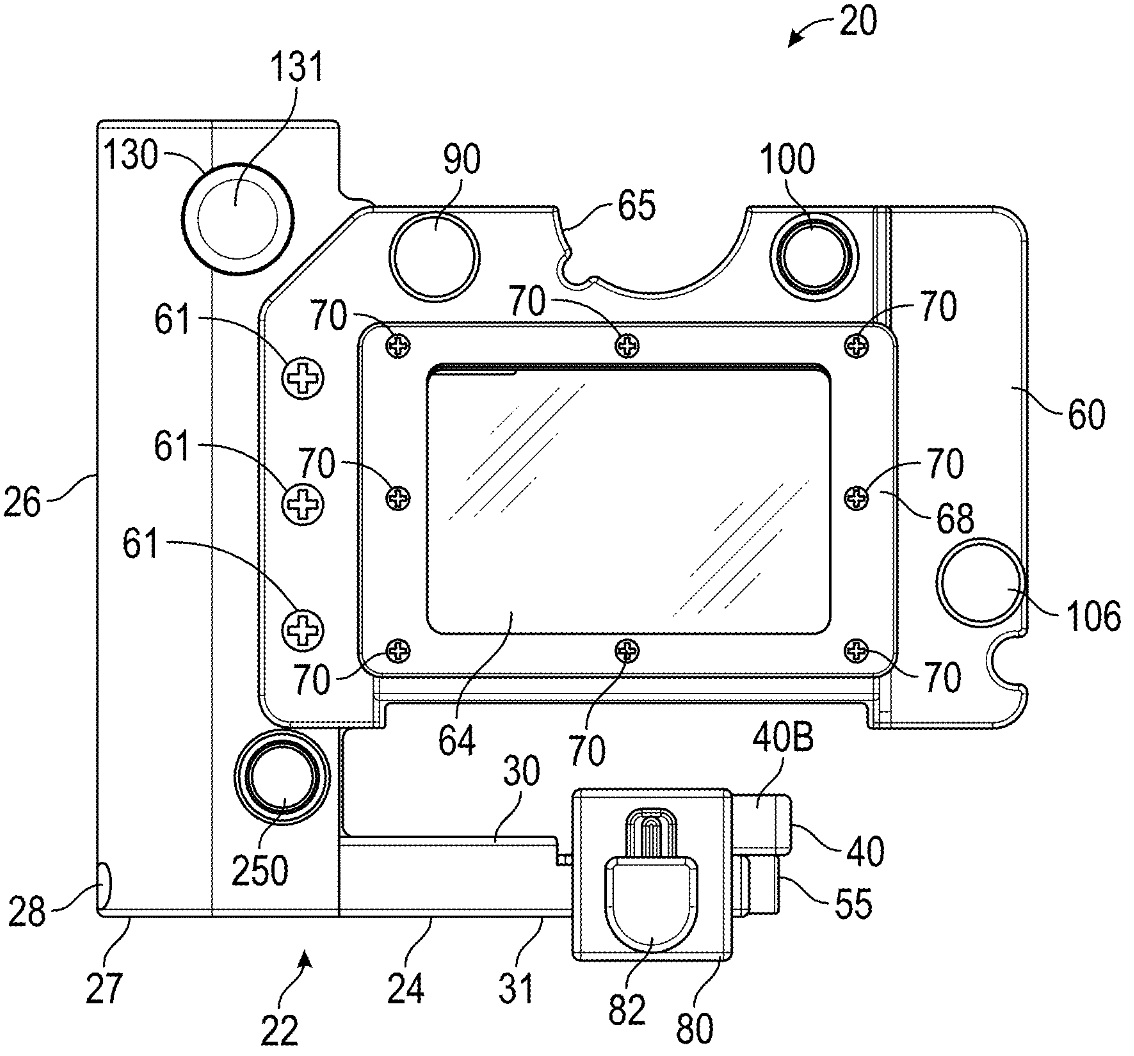
FIG. 3 is a rear view of the ergonomic camera handle.

Referring to FIGS. 1-4, handle 20 further comprises panel structure 60 that is attached to generally upright portion 26. In some embodiments, panel structure 60 is attached to generally upright portion 26 with screws 61. Panel structure 60 is configured with an opening within which window 64 is positioned. Any suitable technique or method may be used to fit and secure window 64 within the opening in panel structure 60. In some embodiments, window 64 is friction-fitted within the opening in panel structure 60. Window 64 may be fabricated from substantially transparent materials including, but not limited to, glass, plexiglass and clear plastic. Panel structure 60 is further configured to allow a rear display screen of a camera to be positioned adjacent to window 64 so as to allow a user to easily view the rear display screen. Window 64 protects the rear display screen from dirt, dust, foreign particles and physical contact with other objects. Panel structure 60 is further configured with angulated side portions 66 and 67 that orient window 64 and the camera rear display screen at a predetermined angle θ (see FIGS. 4 and 5A). In some embodiments, the predetermined angle θ is between about 8° and 12°. However, in other embodiments, the predetermined angle θ may be less than 8° or more than 12°. Handle 20 further comprises frame member 68 that is removably attached to panel structure 60 and configured to extend about window 64. In some embodiments, panel structure 60 and frame member 68 are configured so that screws 70 may be used to removably attach frame member 68 to panel structure 60. Panel structure 60 is configured with notch 65 that is sized for receiving camera viewfinder 204 (see FIG. 9). As shown in FIGS. 1 and 2, panel structure 60 includes an electrical wire channel 69. The purpose of electrical wire channel 69 is discussed in the ensuing description.

Referring to FIGS. 3, 4, 5A and 5B, handle 20 further comprises mounting bracket 80 that is attached to bottom side 31 of base portion 24. Mounting bracket 80 comprises knob 82 that is configured to be removably inserted into a corresponding receptacle (not shown) that is attached to or part of user equipment such as tools, tool carts, tool belts and vehicles. In some embodiments, mounting bracket 80 is integral with base portion 24. In other embodiments, mounting bracket 80 is configured to be removably attached to bottom side 31 of base portion 24. In some embodiments, knob 82 is substantially "D" shaped.

Referring to FIGS. 1-4, 5A and 5B, handle 20 further comprises push-button 90 that is mounted to panel structure 60. Push-button 90 is located at a predetermined location on panel structure 60. The predetermined location is aligned with a corresponding camera function button when camera 200 is mounted on base portion 24. Push-button 90 comprises rear portion 92 (see FIGS. 1 and 2) that engages the corresponding camera function button when push-button 90 is depressed. In one embodiment, push-button 90 is aligned with the FN4 function on the camera. In some embodiments, push-button 90 is configured as a spring-loaded mechanical plunger-type push-button.

As shown in FIGS. 1 and 2, handle 20 further comprises electrical push-button 100 that is mounted on panel structure 60. Electrical push-button 100 includes contacts or leads 102 (e.g., solder tabs) that are electrically connected to wires (not shown) that are positioned within wire channel 69 and which extend through electrical wire harness 112 and connected to leads or pins (not shown) in electrical signal connector 114. Electrical signal connector 114 is configured to be electrically connected to auxiliary electrical signal port 202 (see FIG. 8) on camera 200. This aspect is further discussed in the ensuing description. In some embodiments, depressing electrical push-button 100 will allow the user to magnify the image on the camera rear display screen by zooming in on the image.

As shown in FIGS. 1 and 2, handle 20 further comprises push-button 106 that is mounted on panel structure 60 and aligned with another corresponding camera function button.

For example, push-button 106 may be aligned with the camera image-review button that allows the user to view previous pictures that were taken. Push-button 106 has rear portion 108 that engages the camera image-review button when push-button 106 is depressed. In some embodiments, push-button 106 is configured as a spring-loaded mechanical plunger-type push-button.

As shown in FIGS. 1, 2 and 4, handle 20 further comprises support structure 122 and elongate guide member 124. Elongate guide member 124 is attached to and extends from support structure 122. Elongate guide member 124 is sized to fit into the opening of a camera strap ring (not shown) that is on the exterior of camera 200. Support structure 122 and elongate guide member 124 cooperate to prevent movement of camera 200 once the camera is mounted to handle 20 and also facilitates alignment of push-buttons 90 and 106 with the corresponding camera function buttons.

Referring to FIGS. 1-4, 8 and 9, generally upright portion 26 includes an interior region 110 that is sized for receiving electrical wire harness 112. Electrical wire harness 112 contains a plurality of electrical wires that are electrically connected to electrical signal connector 114 that is located at one end of electrical wire harness 112. Electrical signal connector 114 is configured for electrical connection to auxiliary electrical signal port 202 located on camera 200 (see FIG. 8). Thus, the electrical wires (not shown) that are electrically connected to contacts or leads 102 of electrical push-button 100 extend through electrical wire harness 112 and are connected to corresponding pins of auxiliary electrical signal port 202. Auxiliary electrical signal port 202 is configured as a multi-pin connector that is electrically connected to internal camera components that are associated with camera functions such as the camera shutter, image zoom, focus control and battery power. Auxiliary electrical signal port 202 is used for remote or external control of these camera functions. Handle 20 further includes cover 115 that is removably attached to the lower portion of generally upright portion 26. In some embodiments, screw 116 is used to removably attach cover 115 to generally upright portion 26. Cover 115 has opening 117 that is sized to allow passage therethrough of electrical wire harness 112. Electrical wire harness 112 extends through interior region 110 in generally upright portion 26. Handle 20 further includes cover 118 that is removably attached to the upper portion of generally upright portion 26. Cover 118 provides access to interior region 110. In some embodiments, cover 118 is removably attached to generally upright portion 26 via screw 119.

Referring to FIG. 4, handle 20 further comprises camera shutter control button assembly 130 that is mounted to generally upright portion 26 and controls the camera shutter and focusing functions. Button assembly 130 comprises depressible button head 131 and electrical button 132. Depressing button head 131 engages electrical button 132. Electrical button 132 includes a plurality of electrical pins 133. Pins 133 are electrically connected to corresponding wires in electrical wire cable harness 112 which are electrically connected to corresponding pins of electrical signal connector 114. Thus, camera shutter control button assembly 130 is electrically connected to the camera electronics that pertain to the camera shutter and focusing functions. In some embodiments, button assembly 130 comprises a two-stage button that allows for easy use, tactile feedback and half-press manipulation to enable focusing of the camera.

Figure 8:
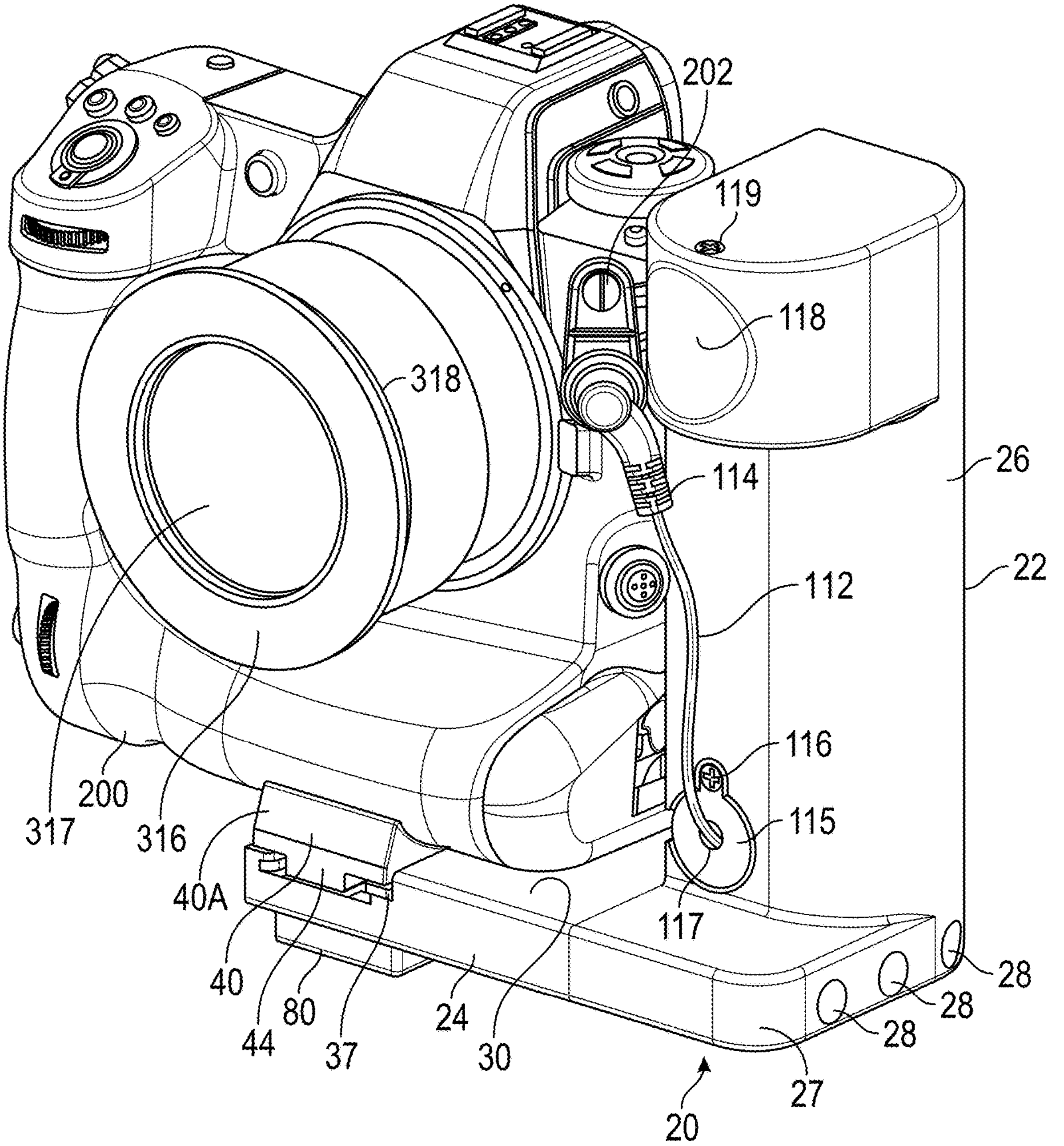
FIG. 8 is a front perspective view of a camera removably attached to the ergonomic camera handle.
Figure 9:
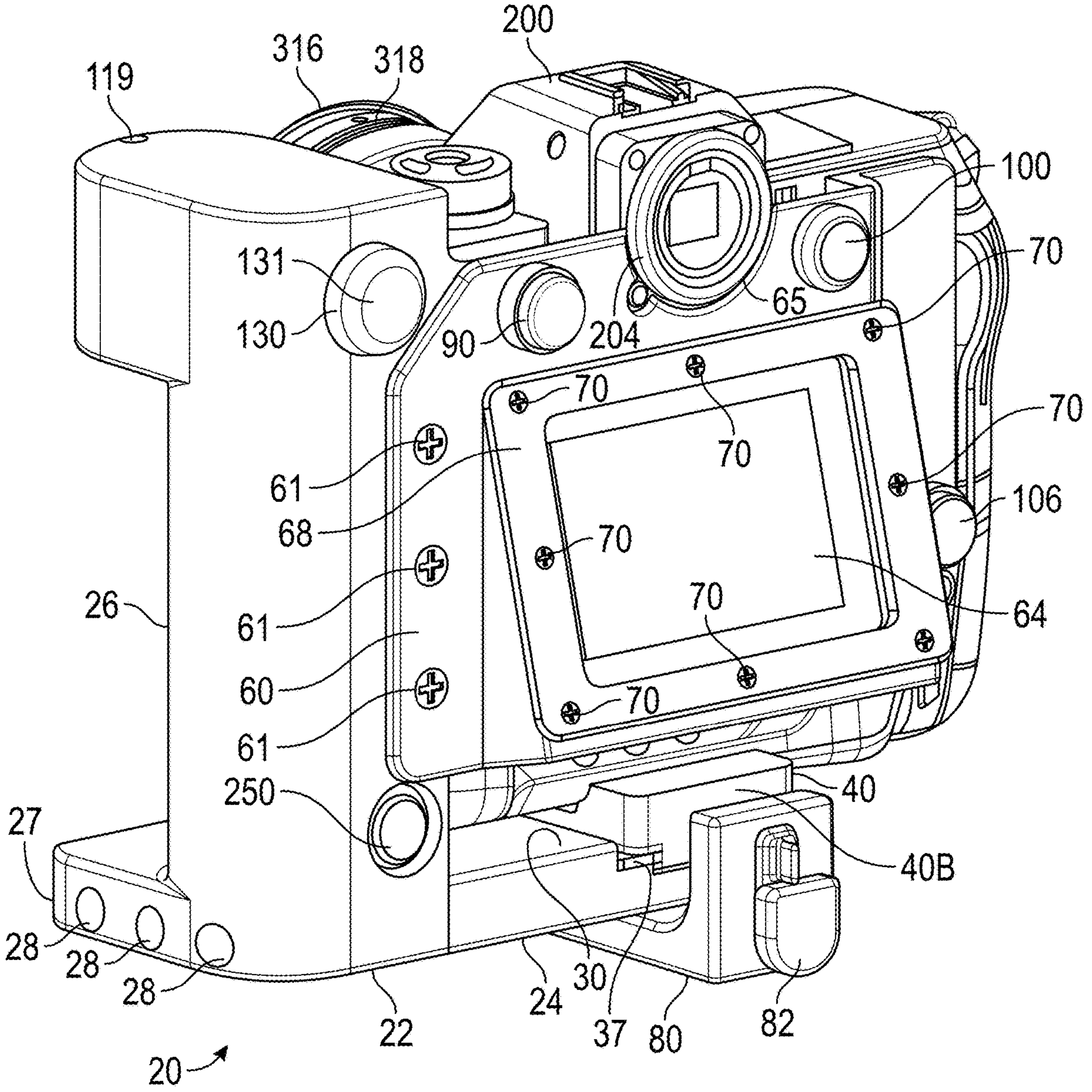
FIG. 9 is a rear perspective view of the camera removably attached to the ergonomic camera handle.

FIGS. 8 and 9 illustrate camera 200 that is removably attached to handle 20. In one example, camera 200 may be the Nikon Z9 Mirrorless Camera which has a rear two-way tilt rear LCD screen. However, it is to be understood camera 200 may be any one of a variety of suitable commercially available cameras. Camera 200 includes auxiliary electrical signal port 202, viewfinder 204 and a rear LCD screen which may be seen through window 64. Camera 200 includes one or more function buttons that implement certain camera functions that were discussed in the foregoing description. Camera 200 also includes a battery (not shown) that provides battery power for camera components and implementing camera functions. Camera 200 may also include a battery power interrupt circuit that has a normal first state in which battery power is provided to the camera and a second state in which battery power is interrupted. Battery power interruption may occur as a result of environmental circumstances, radiation, electromagnetic pulse (EMP) or a camera system “crash” related to software or electronics. In one example, the camera’s battery power interrupt circuit comprises a MOSFET. The MOSFET has a normal “ON” state in which battery power is provided to camera components and an “OFF” state in which battery power to the camera components is interrupted. The battery power interruption circuit is electrically connected to auxiliary electrical signal port 202. The wires in electrical wire harness 112 electrically connect the battery power interruption circuit to camera reset button 250 that is mounted to generally upright portion 26 of handle 20. Depressing and releasing camera reset button 250 resets or restarts camera 200. In some embodiments, camera reset button 250 is configured as a spring-loaded push-button.

Figure 10:
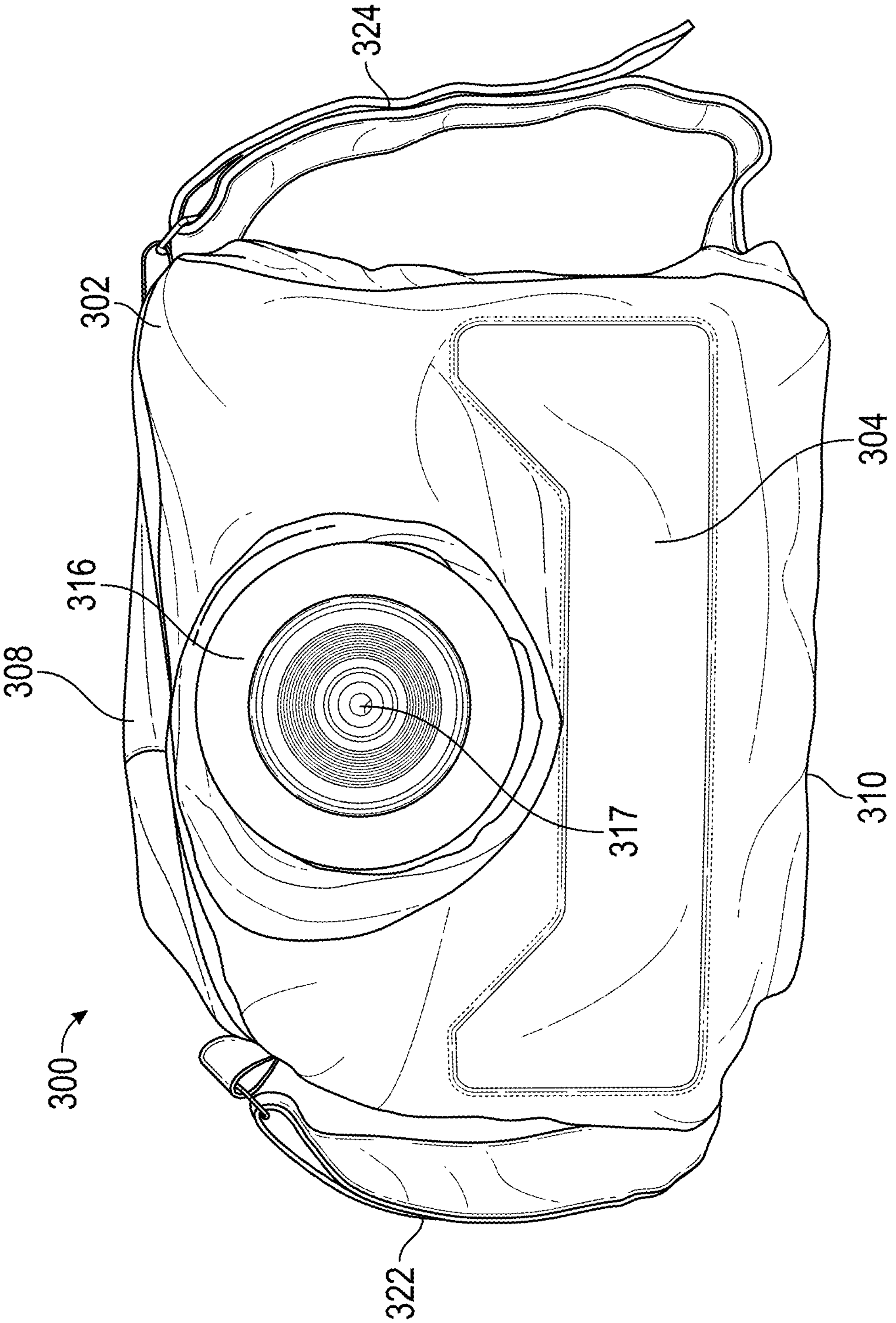
FIG. 10 is a front view of a protective enclosure having therein the camera and ergonomic camera handle in accordance with the present disclosure.
Figure 11:
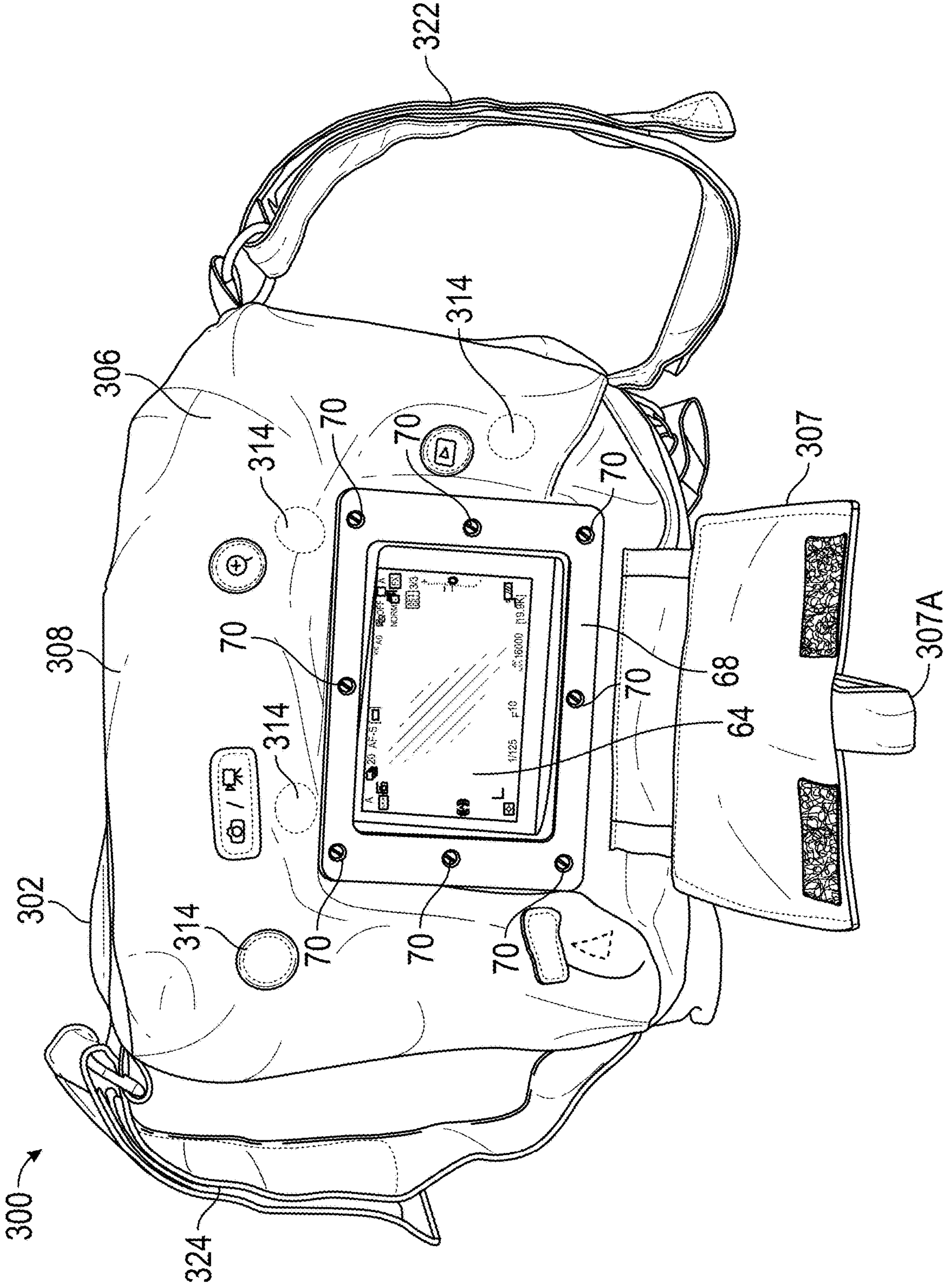
FIG. 11 is a rear view of the protective enclosure having therein the camera and ergonomic camera handle.
Figure 12:
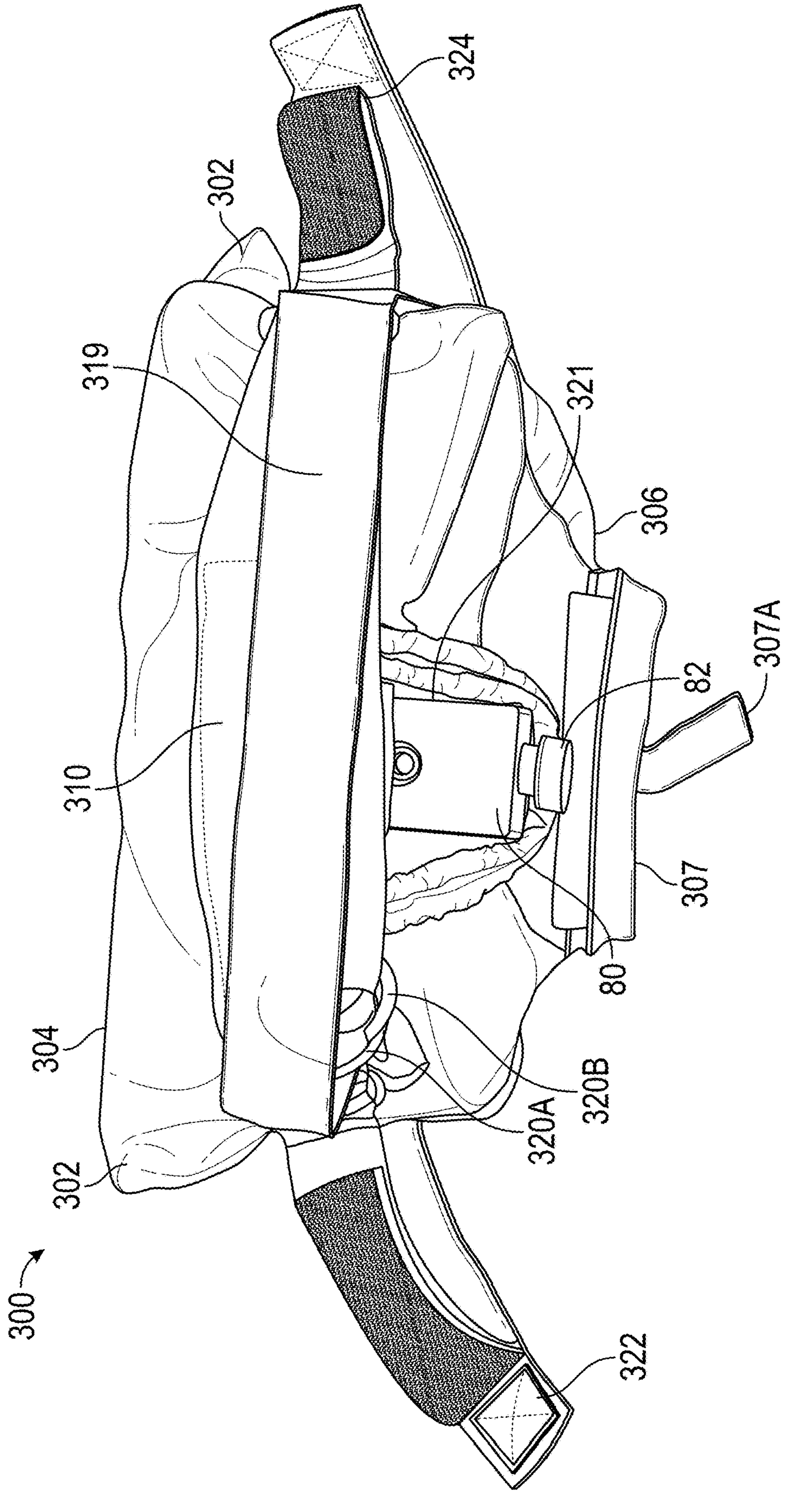
FIG. 12 is a bottom view of the protective enclosure having therein the camera and the ergonomic camera handle.

Referring to FIGS. 10-12, there is shown ergonomic camera system 300 for use in extreme environments. System 300 comprises protective enclosure 302 that has an interior region in which ergonomic camera handle 20 and camera 200 are positioned. Camera 200 is removably attached to base portion 24 as described in the foregoing description. Protective enclosure 302 protects handle 20 and camera 200 from extreme environments and is fabricated from a flexible fabric material that is thermally insulative. In some embodiments, the aforesaid flexible fabric material is also waterproof and heat-reflective. Protective enclosure 302 comprises front portion 304, rear portion 306, top portion 308 and bottom portion 310. Front portion 304 is configured with an opening that is aligned with the camera lens. Rear portion 306 is configured with an opening that is sized to allow viewing of window 64. Flap 307 is hingedly attached to rear portion 306 and may be opened to view window 64 or closed to protect window 64. Flap 307 includes pull-strap 307A for pulling flap 307 open. Any suitable technique (e.g., Velcro™) may be used to keep flap 307 in the closed position. Portions of protective enclosure 302 that extend about window 64 are secured between panel structure 60 and frame member 68 via screws 70. Screws 70 extend through corresponding openings in the portions of protective enclosure 302 that are between panel structure 60 and frame member 68. Protective enclosure 302 is configured with indicia 314 on rear portion 306 that indicate the location of the push-buttons that are mounted on generally upright portion 26 and panel structure 60. Lens protector 316 extends through the opening in front portion 304 and is mounted to the camera lens. Lens protector 316 comprises clear filter 317 that protects the camera lens and is configured with circumferentially extending groove 318 (see FIGS. 8 and 9). In some embodiments, clear filter 317 is fabricated from sapphire. A portion of the protective enclosure 302 extends about and is disposed within groove 318. In some embodiments, the portion of protective enclosure 302 that is disposed within groove 318 is configured to have a degree of elasticity so as to maintain this portion of protective enclosure 302 within groove 318. Protective enclosure 302 is configured with opening 321 in bottom portion 310 through which a portion of mounting bracket 80 extends such that knob 82 is fully exposed. In one embodiment, protective enclosure 302 is configured as a roll-up dry bag that prevents dust and foreign particles from entering the interior of protective enclosure 302. In such an embodiment, bottom portion 310 of protective enclosure 302 is actually formed by rolling up the dry bag and securing the rolled-up portion in place with strap 319. Strap 319 extends through rings 320A and 320B. Rings 320A and 320B allow tightening of the loose, extra length of strap 319. Protective enclosure 302 further includes integrated loops 322 and 324 that allow a user to use a single hand to hold protective enclosure 302 when handle 20 and camera 200 are positioned within protective enclosure 302.

Base portion 24 and generally upright portion 26 may be fabricated via any one of a variety of fabrication methods including, but not limited to, non-metal injection molding, metal injection molding, and 3D printing. Suitable materials for 3D-printing include, but are not limited to, ABS, PETG, Nylon, PLA, nylon-carbon composites and metal filled filaments that contain very fine metal powder such as copper, brass, bronze or stainless steel. In some embodiments, base portion 24 is fabricated from metal (e.g., aluminum) and generally upright portion 26 is fabricated via a 3D printing process using non-metal material. If base portion 24 is fabricated from metal, then slot 32 is hard-coat anodized for wear resistance. In other embodiments, base portion 24 and generally upright portion 26 are both fabricated from metal injection molding. In other embodiments, base portion 24 and generally upright portion 26 are both fabricated from non-metal injection molding. In some embodiments, mounting bracket 80 may be formed with base portion 24 during the aforementioned injection molding or 3D printing processes. In other embodiments, mounting bracket 80 is a separate component that is attached bottom side 31 of base portion 24. Retainer member 37, panel structure 60, frame member 68 and mounting bracket 80 may also be fabricated from non-metal injection molding, metal injection molding or 3D printing using any of the aforementioned materials.

Ergonomic camera system 300 provides significant ergonomic features that allow a user to operate the camera when the user is wearing protective gloves, such as space suit gloves. Handle 20 utilizes large, tactile push-buttons and plunger-type buttons that are easy to engage when handle 20 and camera 200 are positioned within the interior region of protective enclosure 302. Handle 20 is configured so that a camera may be mounted or removed from base portion 24 without the need for tools. Panel structure 60 orients window 64 and the rear display screen of the camera 200 at an angle that is optimal for viewing by a user while wearing personal protective equipment (PPE), such as a space suit helmets, protective gloves and goggles. Protective enclosure 302 protects handle 20 and camera 200 from extreme temperatures, humidity, moisture, foreign particles and dust. Lens protector 316 protects the camera lens from foreign particles and dust. Ergonomic camera system 300 allows users to operate camera 200 while engaging in activities in environments that are subject to temperature extremes, rapid weather changes, foreign particles and dust. Examples of such activities include, but are not limited to, space extra-vehicular activities (EVA), research expeditions to volcanoes, *Antarctica* or the Artic, and photographing and/or videoing welding and metal foundry processes. Ergonomic camera system 300 may be used by anyone with limited hand dexterity and strength. Furthermore, persons with disabilities or health conditions that limit hand control may use handle 20, with camera 200 mounted thereto, without protective enclosure 302 and lens protector 316.

The description of the present disclosure has been presented for purposes of illustration and description, but is not intended to be exhaustive or limited to the disclosure in the form disclosed. In the foregoing description, numerous specific details are set forth to provide a thorough understanding of the embodiments described in this disclosure. However, one having ordinary skill in the art should recognize that the embodiments might be practiced without these specific details. In some instances, well-known structures and techniques have not been shown in detail for ease of illustration and to avoid obscuring the description of the embodiments. It should be emphasized that the above-described embodiments are only non-limiting examples of implementations and were chosen and described in order to best explain the principles of the disclosure. Many modifications and variations will be apparent to those of ordinary skill in the art without departing from the scope and spirit of the disclosure. It is intended that the following claims be interpreted to embrace all such modifications and variations.

What is claimed is:

1. An ergonomic camera handle, comprising:

an "L" shaped body having a base portion and a generally upright portion, the base portion being configured for removably attaching thereto a camera;

a panel structure attached to the generally upright portion and configured with a window opening and a notch for receiving a camera viewfinder;

a window positioned within the opening in the panel structure;

wherein the panel structure is configured such that when a camera having a rear display screen is mounted to the base portion, the rear display screen is adjacent to the window; and at least one push-button mounted to the panel structure, the push-button being located at a predetermined location such that the push-button is aligned with a corresponding camera function button when a camera is attached to the base portion, wherein the push-button engages the corresponding camera function button when the push-button is depressed.

2. The ergonomic camera handle according to claim 1 wherein the at least one push-button comprises a plurality of push-buttons, each of which being located at a predetermined location on the panel structure so as to be aligned with a corresponding camera function button.

3. The ergonomic camera handle according to claim 1 further comprising:

a camera shutter control button assembly mounted on the generally upright portion; and an electrical signal connector electrically connected to the camera shutter control button assembly and configured for electrical connection to an auxiliary electrical signal port on the camera.

4. The ergonomic camera handle according to claim 3 further comprising a camera reset button assembly mounted on the generally upright portion and electrically connected to the electrical signal connector.

5. The ergonomic camera handle according to claim 1 wherein the panel structure is configured to orient the rear display screen of the camera at a predetermined angle.

6. The ergonomic camera handle according to claim 1 further comprising a frame member removably attached to the panel structure and extending about the window opening.

7. The ergonomic camera handle according to claim 1 wherein the window is fabricated from a material selected from the group consisting of glass, plexiglass and transparent plastic.

8. The ergonomic camera handle according to claim 1 wherein the base portion is configured with a slot for removably inserting therein a base plate attached to a camera.

9. The ergonomic camera handle according to claim 8 further comprising a lock mechanism movably attached to the base portion and having a first normal state in which the lock mechanism retains the base plate within the slot and a second state in which the lock mechanism allows the base plate to be removed from the slot.

10. The ergonomic camera handle according to claim 1 further comprising a mounting bracket attached to the base portion and configured to be removably mounted to an external object.

11. An ergonomic camera handle, comprising:

- an "L" shaped body having a base portion and a generally upright portion;
- wherein the base portion is configured with a slot for removably inserting therein a base plate attached to a camera;
- a lock mechanism movably attached to the base portion and having a first normal state in which the lock mechanism retains the base plate within the slot and a second state in which the lock mechanism allows the base plate to be removed from the slot;
- a panel structure attached to the generally upright portion and configured with an opening and a notch, wherein the notch is configured to receive a camera viewfinder;
- a window positioned within the opening in the panel structure;
- wherein the panel structure is configured such that when a camera having a rear display screen is mounted to the base portion, the rear display screen is adjacent to the window, and wherein the panel structure is configured to orient the window and the rear display screen at a predetermined angle;
- at least one push-button mounted to the panel structure, the push-button being located at a predetermined location such that the push-button is aligned with a corresponding camera function button when a camera is mounted on the base portion, wherein the push-button engages the camera function button when the push-button is depressed;
- a camera shutter control button assembly mounted on the generally upright portion; and
- an electrical signal connector electrically connected to the camera shutter control button assembly and configured for electrical connection to an auxiliary electrical signal port on the camera.

12. The ergonomic camera handle according to claim 11 further comprising a camera reset button assembly mounted on the generally upright portion and electrically connected to the electrical signal connector.

13. The ergonomic camera handle according to claim 11 wherein the at least one push-button comprises a plurality of push-buttons, each of which being located at a predetermined location on the panel structure so as to be aligned with a corresponding camera function button.

14. The ergonomic camera handle according to claim 11 further comprising a frame member removably attached to the panel structure and extending about the opening in the panel structure.

15. The ergonomic camera handle according to claim 11 further comprising a mounting bracket attached to the base portion and configured for removable attachment to an external object.

16. An ergonomic camera system for extreme environments, comprising:

- a camera having a bottom portion, a base plate attached to the bottom portion, a rear display screen, a viewfinder, a shutter, at least one camera function button, a camera lens, an auxiliary electronic signal port and a battery;
- an ergonomic camera handle comprising:
  - an "L" shaped body having a base portion and a generally upright portion;
  - wherein the base portion is configured with a slot for removably inserting therein the base plate of the camera;
  - a lock mechanism movably attached to the base portion and having a first normal state in which the lock mechanism retains the base plate within the slot and a second state in which the lock mechanism allows the base plate to be removed from the slot;
  - a panel structure attached to the generally upright portion and configured with an opening and a notch, wherein the notch is configured to receive the camera viewfinder;
  - a window positioned within the opening in the panel structure;
  - wherein the panel structure is configured so that the rear display screen of the camera is adjacent to the window and wherein the panel structure is configured to orient the window and the rear display screen at a predetermined angle;
  - a frame member removably attached to the panel structure and extending about the window;
  - at least one push-button mounted to the panel structure and located at a predetermined location such that the push-button is aligned with the at least one camera function button, wherein the push-button engages the camera function button when the push-button is depressed;
  - a camera shutter control button assembly mounted on the generally upright portion; and
  - an electrical signal connector electrically connected to the camera shutter control button assembly and configured for electrical connection to the auxiliary electrical signal port on the camera;
- a protective enclosure enclosing the ergonomic camera handle and the camera, the protective enclosure comprising a front portion, rear portion, top portion and bottom portion, wherein the front portion is configured with a front opening that is aligned with the camera lens and the rear portion is configured with a rear opening sized for viewing the window in the panel structure, wherein portions of the protective enclosure extending about the rear opening are secured between the panel structure and the frame member, and wherein the rear portion of the protective enclosure is configured with indicia that indicates the location of push-buttons on the ergonomic camera handle; and
- a lens protector extending through the front opening and mounted to the camera lens and comprising a clear filter that protects the camera lens, the lens protector being configured with a circumferentially extending groove, wherein a portion of the protective enclosure is secured within the circumferentially extending groove.

17. The ergonomic camera system according to claim 16 wherein the protective enclosure is fabricated from a flexible fabric material that is thermally insulative.

18. The ergonomic camera system according to claim 16 further comprising a mounting bracket attached to the base portion and configured to be removably mounted to an external device, wherein the bottom portion of the protective enclosure is configured with an opening sized for allowing the mounting bracket to extend therethrough.

19. The ergonomic camera system according to claim 16 further comprising a camera reset button assembly mounted on the generally upright portion and electrically connected to the electrical signal connector.

* * * * *